United States Patent [19]
Bontrager

[11] Patent Number: 6,015,191
[45] Date of Patent: Jan. 18, 2000

[54] TAILGATE APPARATUS

[76] Inventor: Ernest R. Bontrager, 4125 Prescott St., Sarasota, Fla. 34232

[21] Appl. No.: 09/075,048

[22] Filed: May 8, 1998

[51] Int. Cl.$^7$ ........................................................ B60P 1/04
[52] U.S. Cl. .......................................................... 298/23 D
[58] Field of Search ............................ 298/23 MD, 23 D, 298/22 R; 296/184, 56

[56] References Cited

U.S. PATENT DOCUMENTS

| | | | |
|---|---|---|---|
| 1,363,917 | 12/1920 | Read | 298/23 D |
| 1,547,525 | 7/1925 | Saxon et al. | 298/23 D |
| 1,821,384 | 9/1931 | Larson | 298/23 D |
| 2,213,385 | 9/1940 | Dailey | 298/23 D |
| 3,230,014 | 1/1966 | Mutti . | |
| 3,721,469 | 3/1973 | Senesac et al. | 298/23 MD |
| 3,890,006 | 6/1975 | Stockwell | 298/23 D |
| 4,059,307 | 11/1977 | Neufeldt | 298/23 R |
| 4,068,892 | 1/1978 | Welch | 298/17 R |
| 4,371,208 | 2/1983 | Stricker | 298/23 D |
| 4,699,428 | 10/1987 | Vick | 298/23 MD |

FOREIGN PATENT DOCUMENTS 209586   2/1957   Australia ............................. 298/23 D

*Primary Examiner*—Stephen T. Gordon
*Attorney, Agent, or Firm*—Charles J. Prescott

[57] ABSTRACT

A tailgate apparatus which automatically opens and closes a tailgate positioned at the rear of a tiltable truck bed of a dump truck. The tailgate is rigidly connected and orthogonally oriented to two spaced forwardly extending gate arms, the forward ends of which are preferably pivotally connected to adjacent the upper margins of the side walls of the truck bed. The tailgate thus moves arcuately upward from the closed position against the ends of the side walls and bottom by an elongated pivot arm which is pivotally connected at each end thereof between the gate arm, preferably each of two gate arms, and a stationary point of the dump truck near the truck bed transverse pivotal tilting axis as the truck bed is tilted. The entire tailgate will thus move manditorily upward arcuately to a position above the side walls to the degree that the truck bed is tilted so that the truck bed may carry and dump debris piled much higher than the side walls. The tailgate may be one-piece or spilt and hinged in barn door fashion.

4 Claims, 5 Drawing Sheets

TAILGATE APPARATUS

BACKGROUND OF THE INVENTION

1. Scope of Invention

This invention relates generally to a tiltable truck bed of a dump truck, and more particularly to a tailgate apparatus for automatically opening and closing the tailgate in an amount directly responsive to, and positively controlled by, the tilted angle of the truck bed.

2. Prior Art

A tailgate of a dump truck having a tiltable truck bed for emptying debris piled into the truck bed is typically attached to the upper rear ends of the side walls by a pivotal connection with the upper corners of the tailgate. When dumping a load of debris, the lower or bottom edge of the tailgate is released from a locked position by an operator and allowed to pivot outwardly from the side walls and the bottom of the truck bed as the truck bed is tilted upwardly.

To dump a load of debris, however, these typical dump trucks require that the operator physically unlock the tailgate before the truck bed is raised. Likewise, the operator must then resecure the otherwise freely pivotable tailgate before leaving the dump sight.

An improved tailgate apparatus is disclosed in U.S. Pat. No. 4,068,892 invented by Welch disclosing a tailgate apparatus which does apparently by gravity automatically raise and lower without the use of a power source and without the need for a locking device which prevents the tailgate from opening while debris is being transported within the truck bed.

However, all of the prior art devices and apparatus known to applicant, including the above Welch invention, do not provide for a positive means for lifting the tailgate above the plane of the upper margins of the side walls to readily facilitate dumping debris contained within the truck bed and which may be piled higher than the side walls. Typically, debris from tree cuttings, paper collection and other debris of a less dense nature can easily be piled above the side walls of the dump truck and remain there secured whether covered or uncovered, while being transported. However, when the prior art dump truck bed is tilted for dumping, the debris piled high above the side walls will jamb and become wedged on the tailgate or tilting mechanism to prevent effective dumping. In such circumstances, the operator must again move to the rear of the truck bed and physically dislodge the jammed debris to effect complete dumping thereof.

An unpatented rear end dump truck is currently being manufactured by Workman and Sons, Inc. of Prineville, Oreg. which somewhat addresses this problem of dumping debris piled higher than the side walls of the truck bed. However, the Workmen-type and dump trucks address this issue by simply adding structure above the side walls near the ends thereof so that the pivotal point of the tailgate is substantially raised above the upper margins of the side walls.

Applicant is aware of several other patented prior art dump truck arrangements, none of which are as similar to the present invention as those prior art devices above described. These additional patented inventions are disclosed in the following U.S. patents:

U.S. Pat. No. 3,890,006 to Stockwell
U.S. Pat. No. 4,371,208 to Stricker
U.S. Pat. No. 4,699,428 to Vick
U.S. Pat. No. 4,059,307 to Neufeldt
U.S. Pat. No. 3,230,014 to Mutti, et al.
U.S. Pat. No. 4,343,511 to Rowan et al.
U.S. Pat. No. 4,659,147 to Smiltneek
U.S. Pat. No. 5,030,053 to Wickizer
U.S. Pat. No. 5,100,279 to Bjerk
U.S. Pat. No. 4,269,039 to Baker The present invention does provide a tailgate apparatus for a dump truck which arcuately moves the tailgate in positive fashion in direct response to the angular tilting of the truck bed. The tailgate, when substantially fully opened by the truck bed being fully tilted for dumping, is positioned substantially above a plane defined by the upper margins of the side walls so that debris piled higher than the side walls will be easily dumped without the need for manual operator assistance. Further, the tailgate will be securely retained in the closed position without the need for operator locking, although same is preferred for secondary or supplemental insurance of tailgate lockage.

BRIEF SUMMARY OF THE INVENTION

This invention is directed to a tailgate apparatus which automatically opens and closes a tailgate positioned at the rear of a tiltable truck bed of a dump truck The tailgate is rigidly connected and orthogonally oriented to two spaced forwardly extending gate arms, the forward ends of which are preferably pivotally connected to adjacent the upper margins of the side walls of the truck bed. The tailgate thus moves arcuately upward from the closed position against the ends of the side walls and bottom by an elongated pivot arm which is pivotally connected at each end thereof between the gate arm, preferably each of two gate arms, and a stationary point of the dump truck near the truck bed transverse pivotal tilting axis as the truck bed is tilted. The entire tailgate will thus move manditorily upward arcuately to a position above the side walls to the degree that the truck bed is tilted so that the truck bed may carry and dump debris piled much higher than the side walls. The tailgate may be one-piece or spilt and hinged in barn door fashion.

It is therefore an object of this invention to provide a tailgate apparatus for a dump truck which will automatically open in direct response to tilting of the truck bed of the dump truck, regardless of the character and volume of the load of debris in the truck bed.

It is another object of this invention to provide a tailgate apparatus for a dump truck which does not require the operator of the dump truck to release any locking mechanism of the tailgate prior to load dumping.

It is still another object of this invention to provide a tailgate apparatus for a dump truck which will arcuately move from a closed position as the truck bed is tilted for dumping into a position substantially above the upper margins of the side walls to facilitate dumping of debris piled above the side walls in the truck bed without the need for operator assistance.

It is yet another object of this invention to provide a tailgate apparatus for a dump truck which will be held in a substantially closed position when the truck bed is in the horizontal position without the need for an operator locking the tailgate from random opening movement In accordance with these and other objects which will become apparent hereinafter, the instant invention will now be described with reference to the accompanying drawings.

DETAILED DESCRIPTION OF THE INVENTION

Figure 1:
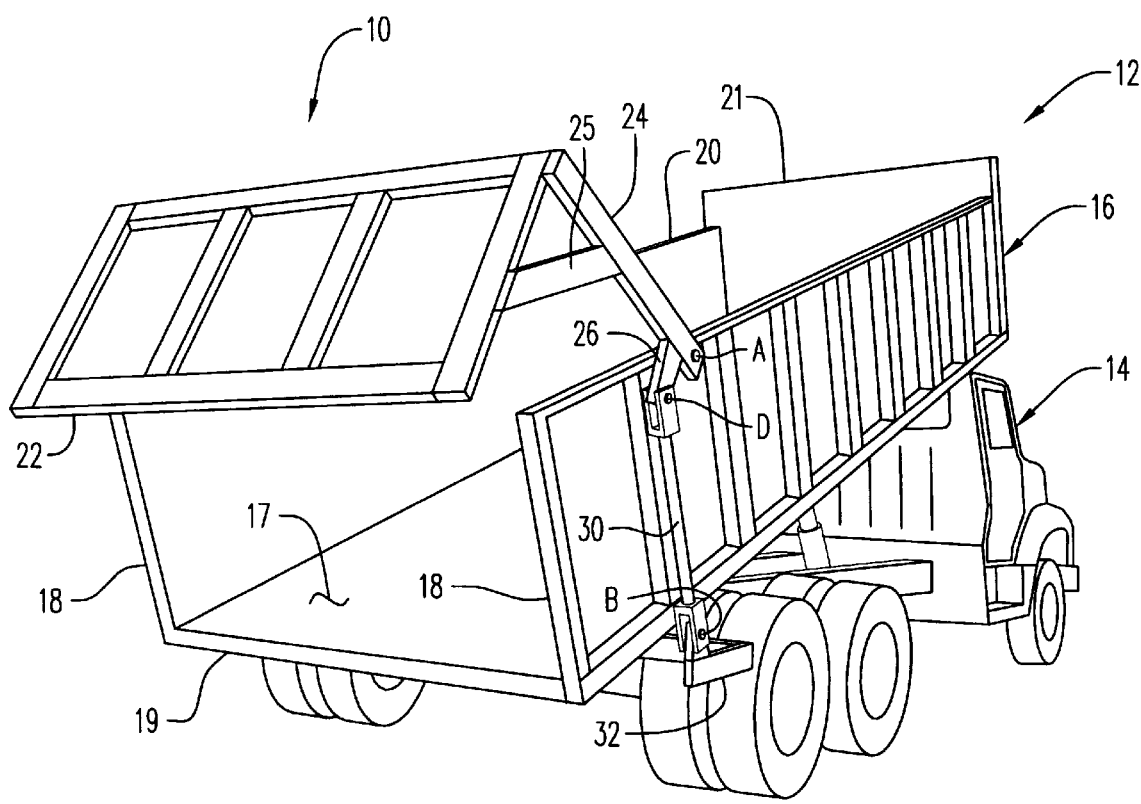
FIG. 1 is a rear perspective view of the preferred embodiment of the invention 10 attached to a conventional tiltable truck bed 16 of a dump truck 12.
Figure 2:
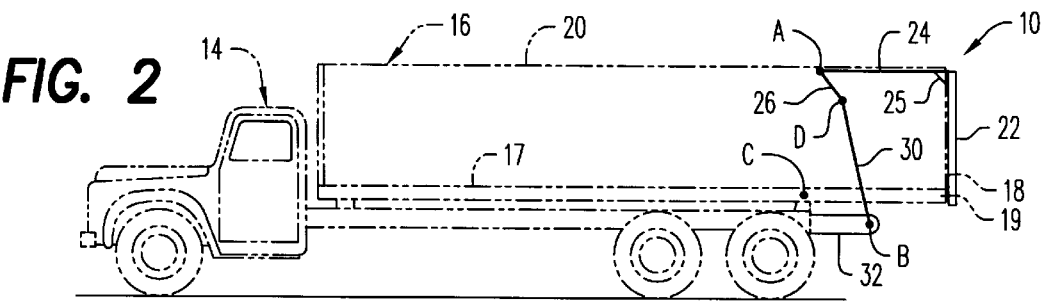
FIG. 2 is a side elevation simplified view of the tailgate apparatus 10 of FIG. 1, showing the dump truck 14 and tiltable bed 16 in its horizontal transport position in phantom.
Figure 3:
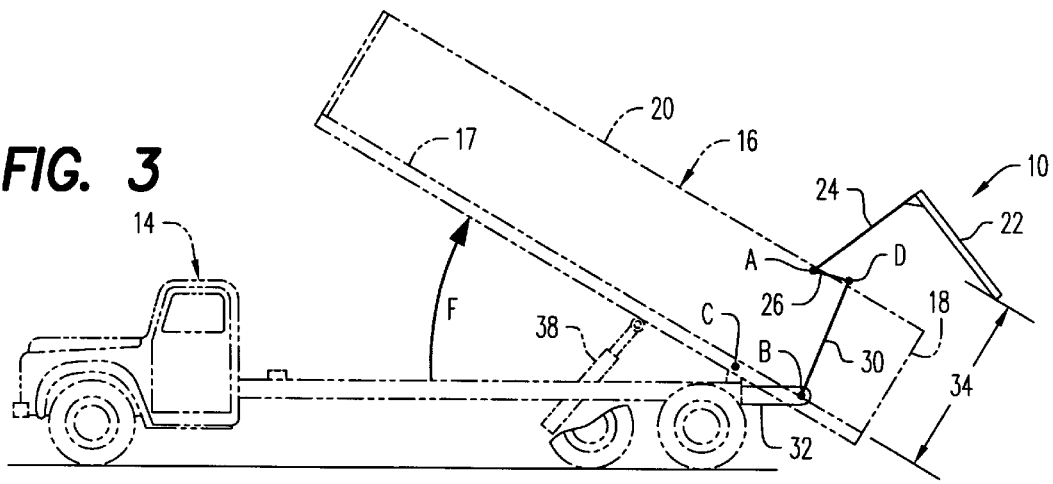
FIG. 3 is a side elevation view similar to FIG. 2 with the truck bed 16 pivotally raised into a partially opened position for the dumping of debris and a corresponding required position of the tailgate apparatus 10.
Figure 4:
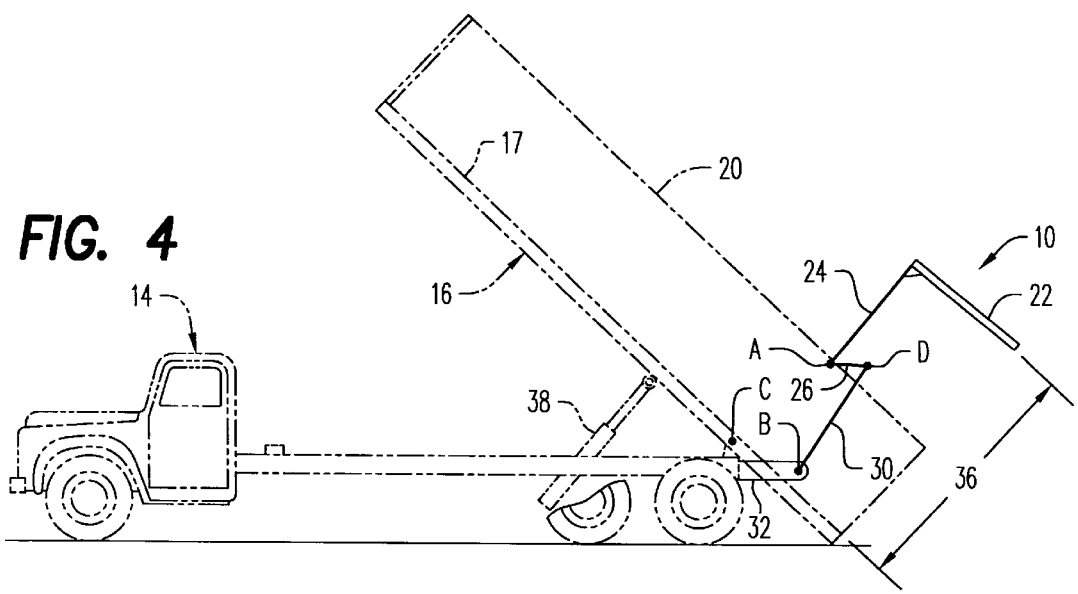
FIG. 4 is a side elevation view similar to FIG. 3 with the truck bed 16 in a fully raised unloaded position with the tailgate apparatus 10 in the required fully opened position.

Referring now to the drawings and particularly to FIGS. 1 to 5, the preferred embodiment of the invention is shown generally at numeral 10 attached to the tiltable truck bed 16 of a dump truck 12. The chassis 14 of the dump truck 12 as best seen in FIGS. 2 to 5, is pivotally connected to the truck bed 16 about a first transversely oriented tilting axis C. Thus, the truck bed 16 will move into the partially tilted position of FIGS. 1 and 3 and 5 by actuating hydraulic lift mechanism 38 and into a fully tilted position for dumping as shown in FIG. 4 with the lift mechanism 38 fully extending. The truck bed 16 generally includes a flat bottom 17, vertical side walls 20 and a vertical front wall 21. The ends 18 of the side walls 20 and the end 19 of the bed 17 define an upright planar opening thereby.

The tailgate apparatus 10 includes a rigid rectangular tailgate 22 which is sized to fit against the ends 18 and 19 of the open rear end of the truck bed 16. A pair of elongated, spaced apart, substantially parallel gate arms 24 are rigidly connected and orthogonally disposed forwardly of the upper corners of the tailgate 22. Triangular bracing 25 rigidly reinforces the orthogonal relationship between each of the two gate arms 24 and the tailgate 22.

Each of the gate arms 24 extend forwardly from the tailgate 22 and are pivotally connected about an axis A oriented transversely to the truck bed 16 forwardly of the side wall ends 18 and just below the upper margins of the side walls 20. An elongated, rigid pivot rod 30, preferably positioned just outboard of both of the side walls 20, is pivotally connected about another transverse axis D to the chassis 14 of the dump truck 12. Thus, with respect to the present invention, axis B is immovable or stationary during tilting of the truck bed 16. The upper end of each of the pivot rods 30 is pivotally connected to each corresponding gate arm 24 about yet another transverse axis D. Axis D is rigidly connected by brace 28 to link 26 so that axis D is displaced downwardly and slightly rearwardly of axis A as best seen in FIGS. 2 and 5.

In this embodiment 10, the truck bed 16 is pivotally connected to the chassis 14 about tilting axis C which is positioned forwardly from the end of the truck bed 16. Fixed axis B, which is also stationary with respect to the chassis 14 by bracket 32, is positioned between the tilting axis C and the end of the truck bed 16.

Figure 5:
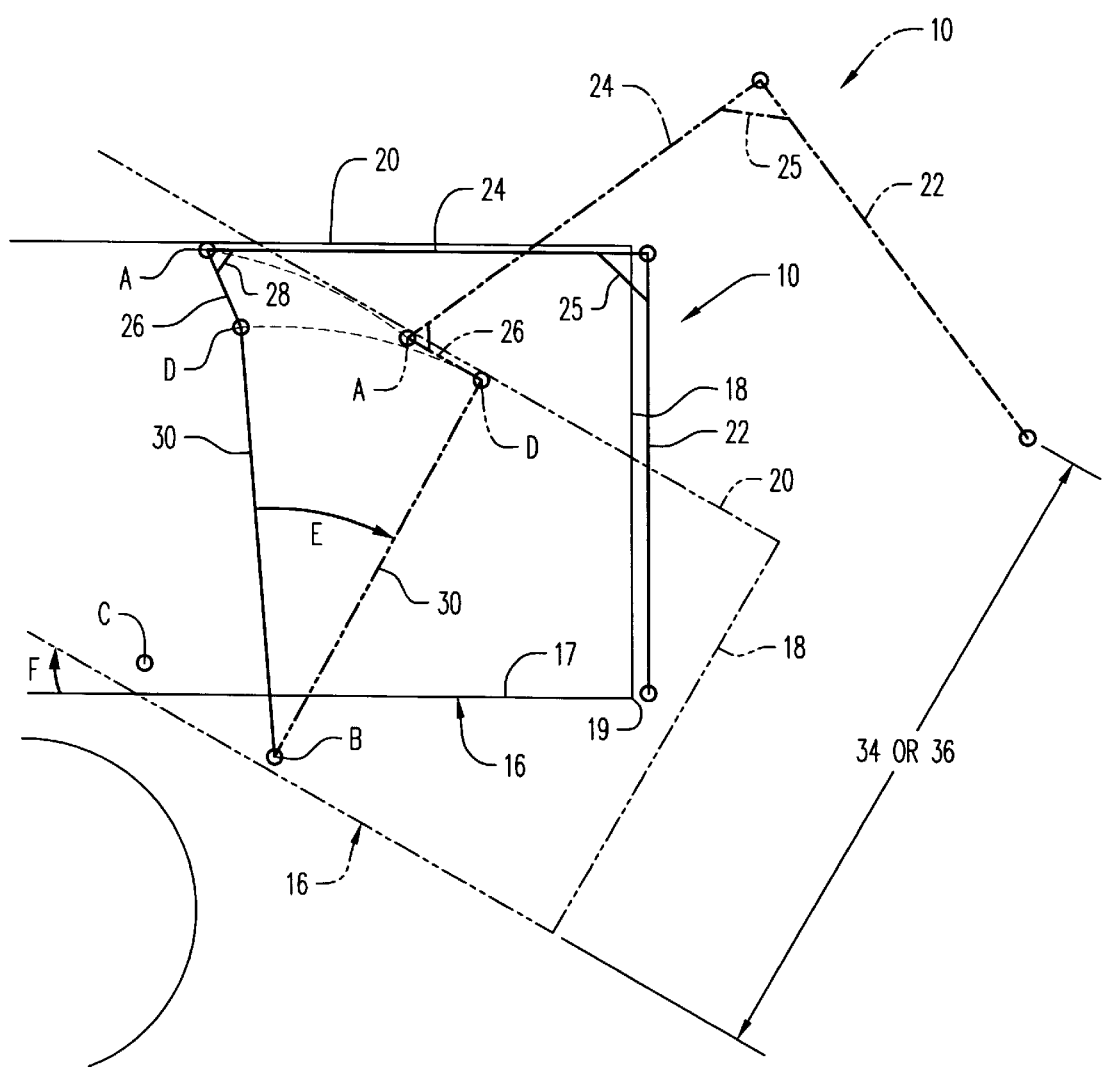
FIG. 5 is an enlarged schematic side elevation view of the invention 10 as shown in FIGS. 1 to 4 showing the truck bed 16 and tailgate apparatus in a tilted position in phantom.

By this arrangement, as the truck bed 16 is tilted upwardly and rotated in the direction of arrow E by actuation of the tilting mechanism 38 in the direction of arrow F of FIG. 5, axis A also necessarily moves in an arch about axis C to a position shown in FIGS. 3, 4 and in phantom in FIG. 5. Link 26, being rigidly connected at the angular orientation with respect to gate arms 24 by brace 28, necessarily moves into the orientation shown in FIGS. 3, 4 and in phantom in FIG. 5. This carries the pivotal axis D to the position there shown, forcing link 26 and the entire tailgate apparatus 10 to also rotate about axis A to the orientation of the tailgate 10 shown in FIGS. 3, 4 and in phantom in FIG. 5.

It should be now clearly understood that the tailgate apparatus 10 moves pivotally and, more specifically, arcuately in direct proportion to the tilting movement of the truck bed 16 unaffected by either gravity or debris. Because the elongated pivot rods 30 are substantially non-extensible and non-compressible, and because link 26 is rigidly oriented and connected as shown with respect to the gate arms 24, the exact arcuate positioning of the tailgate apparatus 10 and the tailgate 22 itself are exactly prescribed for each tilted orientation of the truck bed 16 selected.

It should be further understood that, even in a partially tilted position of the truck bed 16 as seen in FIGS. 3 and 5, the closest point of the tailgate apparatus 10 to the bottom 17 which is defined by the lower margin of the tailgate 22 is a distance 34 from the bottom 17 of the truck bed 16 and is substantially higher from the bottom 17 than are the upper margins of the side walls 20. This provides the additional height clearance to facilitate very easy dumping of debris within the truck bed which has been piled higher than the upper margins of the side walls 20. When tilted to its fully dumped orientation of FIG. 4, even greater clearance 36 is provided between the bottom 17 and the tailgate 22 as shown.

Through simply geometric drawing analysis, equipped with an understanding of the invention 10 as thus far disclosed, it becomes clear that variations in the arcuate opening in the tailgate apparatus 10 may be effected by the relative positioning of the axes A, B, C and D of this embodiment 10. For example, by moving axis B rearwardly, the arcuate opening movement of the tailgate 22 is increased. By moving axis B upwardly, the arcuate opening of the tailgate 22 is decreased. Shortening of length 26 also increases the arcuate opening of the tailgate 22. However, by positioning axis D directly below axis A, an interference is caused and the invention becomes inoperative.

Figure 6:
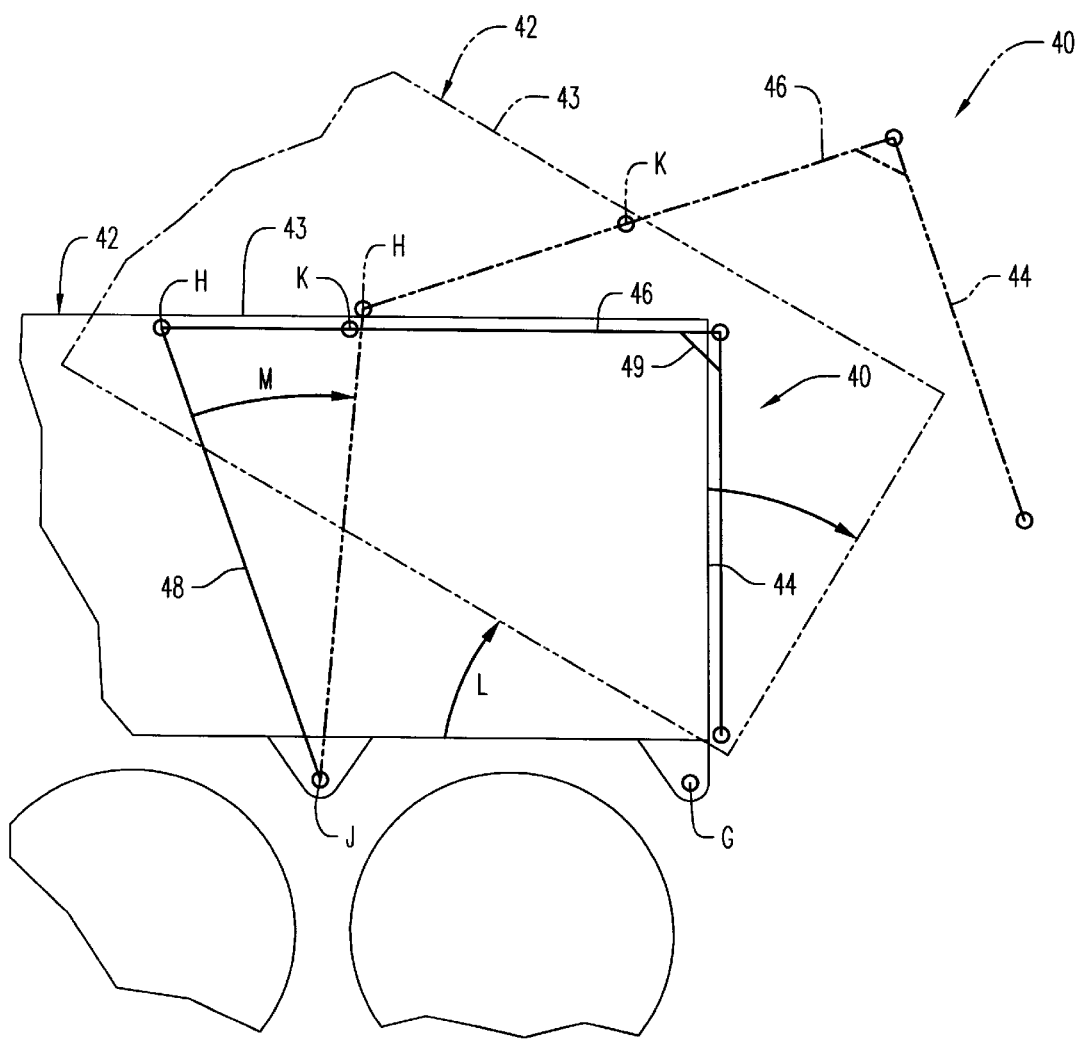
FIG. 6 is a simplified side elevation view of another embodiment 40 of the invention showing the tiltable truck bed 42 in a partially elevated unloading position in phantom.

Referring now to FIG. 6, another embodiment of the invention is there shown generally at numeral 40. In this embodiment 40, the truck bed 42 is pivotally connected to the chassis of the dump truck about a transverse axis G which is oriented substantially at the rearward end of the truck bed 42.

The tailgate apparatus 40 again includes a tailgate 44 as previously described rigidly connected and strengthened by brace 49 to orthogonally oriented spaced apart gate arms 46 which are positioned just outboard of the upright side walls 43 of the truck bed 42. In this embodiment 40, the gate arms 46 are pivotally connected about a transverse axis K which is somewhat centrally positioned along the length of the gate arms 46. A pivot rod 48, preferably on each side of the dump truck bed 42 is pivotally connected to the chassis at axis J which is positioned forwardly of tilting axis G. Each elongated non-extensible and non-compressible tilting rod 48 is pivotally connected at its upper end about a transverse axis H located at the forwardly end of each of the gate arms 46.

Thus, as the truck bed 42 is tilted about tilting axis G in the direction of arrow L, pivotal axis K arcuately moves about pivotal axis G into the direction M shown in phantom. Axis H at the upper end of pivotal links 48 is carried into the position shown in phantom, causing the gate arms 46 to rotate and arcuately move also into the direction shown in phantom. This tilting movement results in tailgate 44 moving into a partially opened position away from the open end of the truck bed 42.

Figure 7:
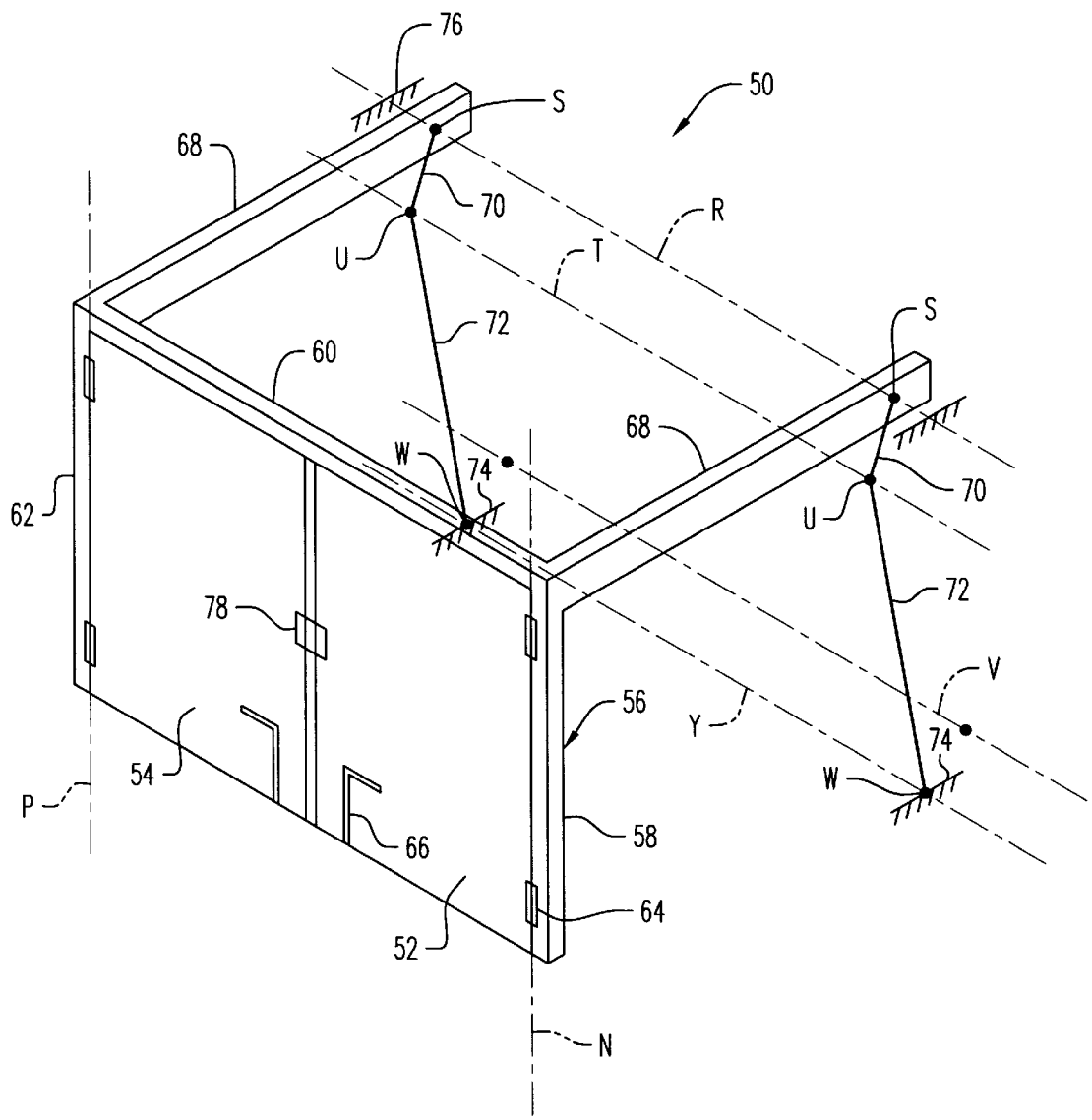
FIG. 7 is a simplified perspective view of another embodiment 50 of the tailgate apparatus having split pivotally openable tailgate doors.

Referring lastly to FIG. 7, another embodiment of the invention is there shown generally at numeral 50. In this embodiment 50, the tailgates are centrally split into two separate tailgate panels 52 and 54 which are hingedly connected at 64 about spaced upright axes N and P to upright legs 58 and 62 of a rigid support frame 56. The frame 56 which supports each of the tailgate panels 52 and 54 includes a top member 60 and the forwardly extending parallel gate arms 68 which are pivotally connected at points S along transverse axis R to the side walls shown symbolically at grounding feature 76 of a truck bed (deleted for clarity).

This embodiment 50 is geometrically similar to the embodiment 10 of FIGS. 1 to 5. Links 70 rigidly connected to gate arms 68 and are pivotally connected about transverse axis T at points U of the upper ends of pivot links 72. Again, these pivot links 72 are rigid and preferably substantially non-extensible and non-compressible and are connected at their lower ends W about a fixed transverse axis Y with respect to the chassis of the dump truck shown symbolically at 74.

Thus, this embodiment 50 causes the rigid frame 56 to move arcuately as previously described in FIGS. 1 to 5, carrying the tailgate panels 52 and 54, connected as one unit by latch 78. When the truck bed (not shown for clarity) is in the horizontal transport position, locking pins 66 may be further used for engagement with the chassis to insure inadvertent opening of the tailgates 52 and 54 about their respective axes N and P.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A tailgate apparatus pivotally connected to a dump truck for automatically opening and closing a tailgate mounted at the rear of a tiltable truck bed of the dump truck, the truck bed having a vertical front wall and vertical side walls, said tailgate disposed adjacent ends of the side walls and a bottom of the truck bed when the truck bed is in a horizontal position, the truck bed tiltable about a first transverse axis attached to a chassis of the dump truck, said first axis positioned forwardly of the end of the bottom and in proximity to, the bottom, the apparatus comprising:

a pair of elongated, spaced apart substantially parallel gate arms each pivotally connected at a forward end thereof to a corresponding said side wall about a second substantially transverse axis positioned forwardly of the ends of the side walls and generally above said first axis;

said tailgate rigidly connected at each side margin thereof generally orthogonally to a corresponding rearward end of each said gate arm;

an elongated substantially upright, rigid pivot rod pivotally connected at a lower end thereof to the chassis about a third substantially transverse axis positioned between the end of the bottom and said first axis, an upper end of said pivot rod pivotally connected to one said gate arm about a fourth substantially transverse axis positioned below said second axis;

said axes being so arranged such that said tailgate arcuately opens in substantially direct proportion to the angular tilting movement of the truck bed about said first axis.

2. A tailgate apparatus pivotally connected to a dump truck for automatically opening and closing a tailgate mounted at the rear of a tiltable truck bed of the dump truck, the truck bed having a vertical front wall and vertical side walls, said tailgate disposed adjacent ends of the side walls and a bottom of the truck bed when the truck bed is in a horizontal position, the truck bed tiltable about a first transverse axis attached to a chassis of the dump truck, said first axis positioned forwardly of the end of the bottom and in proximity to, the bottom, the apparatus comprising:

a pair of elongated, spaced apart substantially parallel gate arms each pivotally connected at a forward end thereof to a corresponding said side wall about a common second substantially transverse axis positioned forwardly of the ends of the side walls and generally above said first axis;

said tailgate rigidly connected at each side margin thereof generally orthogonally to a corresponding rearward end of each said gate arm;

a pair of elongated substantially upright, rigid pivot rods each positioned adjacent an outer surface of a corresponding said side wall and pivotally connected at a lower end thereof to the chassis about a third substantially transverse axis positioned between the end of the bottom and said first axis, an upper end of each said pivot rod pivotally connected to a corresponding said gate arm about a fourth substantially transverse axis positioned below said second axis;

said axes being so arranged such that said tailgate arcuately opens in substantially direct proportion to the angular tilting movement of the truck bed about said first axis whereby said tailgate is positioned substantially above a plane defined by the upper margins of the side walls.

3. The apparatus of claim 1 wherein the tailgate is a two-panel split tailgate.

4. The apparatus of claim 2 wherein the tailgate is a two-panel split tailgate.

* * * * *